(12) United States Patent
Qiu

(10) Patent No.: US 12,054,567 B2
(45) Date of Patent: Aug. 6, 2024

(54) COATING COMPOSITION FOR METAL SURFACE PRE-TREATMENT, ITS PREPARATION AND USE THEREOF

(71) Applicant: Henkel AG & Co. KGaA, Duesseldorf (DE)

(72) Inventor: Xueting Qiu, Shanghai (CN)

(73) Assignee: Henkel AG & Co. KGaA, Duesseldorf (DE)

( * ) Notice: Subject to any disclaimer, the term of this patent is extended or adjusted under 35 U.S.C. 154(b) by 0 days.

(21) Appl. No.: 15/012,905

(22) Filed: Feb. 2, 2016

(65) Prior Publication Data

US 2016/0145444 A1    May 26, 2016

Related U.S. Application Data

(63) Continuation of application No. PCT/CN2013/080922, filed on Aug. 6, 2013.

(51) Int. Cl.

| | |
|---|---|
| *C08F 220/18* | (2006.01) |
| *C08G 65/336* | (2006.01) |
| *C08G 77/26* | (2006.01) |
| *C08G 77/58* | (2006.01) |
| *C09D 5/08* | (2006.01) |
| *C09D 133/08* | (2006.01) |
| *C09D 183/08* | (2006.01) |
| *C09D 183/14* | (2006.01) |
| *C09J 183/04* | (2006.01) |
| *C23C 18/12* | (2006.01) |
| *C23C 18/16* | (2006.01) |
| *C23C 18/42* | (2006.01) |
| *C23C 22/34* | (2006.01) |

(52) U.S. Cl.
CPC ...... *C08F 220/1804* (2020.02); *C08G 65/336* (2013.01); *C09D 5/082* (2013.01); *C09D 5/084* (2013.01); *C09D 5/086* (2013.01); *C09D 133/08* (2013.01); *C09D 183/08* (2013.01); *C09D 183/14* (2013.01); *C09J 183/04* (2013.01); *C23C 18/122* (2013.01); *C23C 18/1241* (2013.01); *C23C 18/1291* (2013.01); *C23C 18/1295* (2013.01); *C23C 18/1637* (2013.01); *C23C 18/42* (2013.01); *C08G 77/26* (2013.01); *C08G 77/58* (2013.01); *C23C 22/34* (2013.01); *C23C 2222/20* (2013.01)

(58) Field of Classification Search
None
See application file for complete search history.

(56) References Cited

U.S. PATENT DOCUMENTS

| | | | |
|---|---|---|---|
| 3,377,303 A | 4/1968 | Peerman et al. | |
| 4,517,028 A * | 5/1985 | Lindert | C09D 5/08 148/251 |
| 4,774,131 A * | 9/1988 | Dahmen | A41D 31/102 442/72 |
| 6,437,071 B1 * | 8/2002 | Odaka | C08G 65/336 524/284 |
| 6,485,838 B1 * | 11/2002 | Shimada | C03C 17/30 428/33 |
| 2004/0139887 A1 | 7/2004 | Zhang | |
| 2006/0090818 A1 | 5/2006 | Carey et al. | |
| 2006/0183845 A1 * | 8/2006 | Harada | C08K 5/17 524/588 |
| 2008/0125539 A1 * | 5/2008 | Mack | C09J 175/04 524/588 |
| 2008/0138615 A1 * | 6/2008 | Kolberg | C09D 5/08 428/341 |
| 2010/0062200 A1 * | 3/2010 | Domes | B05D 1/30 428/35.8 |
| 2011/0034627 A1 * | 2/2011 | Boudet | C08G 18/10 524/588 |
| 2011/0190420 A1 * | 8/2011 | Nagelsdiek | C08G 59/50 523/428 |
| 2011/0281118 A1 | 11/2011 | Wan et al. | |
| 2012/0055105 A1 | 3/2012 | Kohl et al. | |
| 2013/0302637 A1 * | 11/2013 | Matsuda | C09D 5/08 428/623 |

FOREIGN PATENT DOCUMENTS

| | | | | |
|---|---|---|---|---|
| CN | 101098982 A | | 1/2008 | |
| CN | 101760736 A | | 6/2010 | |
| DE | 19727029 A1 * | | 1/1999 | ............ C08G 18/12 |
| EP | 0931820 A1 | | 7/1999 | |
| EP | 1054047 A2 | | 11/2000 | |

(Continued)

OTHER PUBLICATIONS

English machine translation DE 19727029 (1999).*

(Continued)

*Primary Examiner* — Kenneth J Stachel

(74) *Attorney, Agent, or Firm* — Mary K. Cameron

(57) ABSTRACT

This invention provided an aqueous coating composition for metal surface pre-treatment comprising:

(i) at least one organosilane with at least one hydrolyzable substituent;

(ii) at least one water soluble and/or water dispersible silane-functional oligomer;

(iii) at least one water-soluble compound of the elements Zr and/or Ti;

The resultant sol-gel coating composition reveals an extended shelf life and after surface pre-treatment using the invented coating compositions the metal substrates have higher resistance to corrosion, humidity and solvent and at the same time have better surface conductivity and paintability.

15 Claims, No Drawings

(56) References Cited

FOREIGN PATENT DOCUMENTS

| | | | |
|---|---|---|---|
| EP | 2223975 A | | 9/2010 |
| EP | 2383370 A1 | | 11/2011 |
| JP | 06172639 A | * | 6/1994 |
| JP | 2002356552 A | | 12/2002 |
| JP | 2005120469 A | | 5/2005 |
| JP | 2007177314 A | | 7/2007 |
| JP | 2009161830 A | | 7/2009 |
| JP | 2009280889 A | | 12/2009 |
| JP | 2012041586 A | | 3/2012 |
| WO | 2007119812 A1 | | 10/2007 |
| WO | 2009019855 A1 | | 2/2009 |
| WO | 2010070729 A1 | | 5/2012 |

OTHER PUBLICATIONS

English machine translation of JP06-172639 (1994).*
CAS Registry No. 108-01-0 Scifinder 2022.*
International Search Report for PCT/CN2013/080922, mailed Apr. 25, 2014, 2 pages. All references cited In the International Search Report are listed herein.
M. L. Zheludkevich et al., "Sol-gel coatings for corrosion protection of metals", Journal of Materials Chemistry, 2005, 15, pp. 5099-5111. (English abstract only), Engl Abst Only.
Supplementary European Search Report for EP 13 89 0875 dated Apr. 26, 2017.

* cited by examiner

COATING COMPOSITION FOR METAL SURFACE PRE-TREATMENT, ITS PREPARATION AND USE THEREOF

BACKGROUND OF THE INVENTION

Field of the Invention

This invention relates to a coating composition for metal surface pre-treatment, its preparation and use thereof.

Statement of Related Art

Hexavalent chromium-containing compounds are conventional corrosion inhibitors for metal surface treatment which exhibit far better corrosion resistance than any other inhibitors. However, chromates are environmentally unfriendly and hazardous. More and more strict environmental regulations will ban the use of $Cr^{6+}$-containing compounds in corrosion resistance systems. The need for development of non-$Cr^{6+}$ environmental-friendly surface treatments is urgent.

M. L. Zheludkevin et. al. (J. Materials Chem., 2005, 15, 5099-5111) suggested prospective candidates for substitution of the chromate pretreatments i.e. sol-gel derived thin films. The sol-gel process is mainly based on hydrolysis and condensation reactions of metal alkoxides. Silicon-organic based sol-gel chemistry is more developed compared with other metal-organic based precursors. There are several types of protective sol-gel coatings including inorganic sol-gel coatings, hybrid sol-gel derived coatings, nano-structured sol-gel coatings, etc.

Hybrid films are very promising materials as they combine properties of a polymeric organic and a ceramic material. The inorganic component may contribute to the increase of scratch resistance, durability and adhesion to the metal substrate while the organic component increases density, flexibility, and functional compatibility with organic paint systems.

Furthermore, the sol-gel derived hybrids can be classified into two different classes, depending on the nature of interfaces between organic and inorganic phases. In the hybrids of the first class there exists no chemical bonds between inorganic and organic phases but only the Van de Waals force is present. The synthesis of the first class of hybrids can be performed by mixing an inorganic sol with an organic phase and carrying out the sol hydrolysis and condensation reactions in the presence of a preformed organic polymer. In the hybrids of the second class the precursors with already covalent or complex bonded organic groups are used for further synthesis of the hybrid sol-gel system. The commonly used sol-gel precursors are commercially available organoalkoxysilanes and metal alkoxides.

Patent publication CN101760736A discloses an aqueous non-$Cr^{6+}$ coating for surface treatment of Zn-galvanized steel comprising a silane, a water-dispersed polymer as well as an acid and water. In its coating system, the polymer has no chemical bonds to silane and therefore the inorganic part and organic part is only physically mixed. Another patent publication EP2223975A1 discloses another kind of aqueous non-$Cr^{6+}$ coating for surface treatment of Zn or Zn alloy which provides an anti-corrosion, homogeneous film with barrier properties. To reach its goal, EP2223975A1 teaches the use of $M_2O$-$nSiO_2$ (M: alkali metals; n: the molar ratio of $SiO_2/M_2O$) in combination with a water-soluble or water-dispersible silane coupling agent and a water-soluble or water-dispersible glycidyl ether. But within such a mixture it cannot be ensured that the interfaces between organic and inorganic phases are small enough, which is expected to bring good performances in various aspects like corrosion resistance, humidity resistance, solvent resistance, surface conductivity, paintability as well as shelf life of coating.

DESCRIPTION OF THE INVENTION

Object of the Invention

This invention is aimed to provide an aqueous non-$Cr^{6+}$ coating composition for metal surface pre-treatment which is environmentally friendly and at the same time has longer shelf life compared with present similar products, and, moreover, after treatment by the invented coating, the metal substrates should have improved performance with respect to resistance of corrosion, humidity and solvents as well as to paintability. A coating of this invention shall be especially suitable for galvanized steel.

Detailing Description of the Invention

The object is solved by providing an aqueous coating composition for metal surface pre-treatment having a pH in the range of from 3 to 6 comprising:
(i) at least one organosilane with at least one hydrolyzable substituent;
(ii) at least one water soluble and/or water dispersible silane-functional oligomer;
(iii) at least one water-soluble compound of the elements Zr and/or Ti.

The chain of —O—Si—O— can improve the oxidation and acidic corrosion resistance of metals under different temperatures due to its high heat resistance and chemical resistance. And the organic group linked to Si atom helps organosilane consistent with silane-functional oligomer.

To overcome the limitation of pure inorganic coatings such as brittleness and high temperature treatment, the organic component is introduced into the inorganic coatings to form an organic-inorganic hybrid coating. In addition, the organic-inorganic hybrid coatings accessible through compositions of this invention reveal very good adhesion to subsequent organic coatings which cannot be attained through compositions that only comprise the organosilane.

The obtained hybrid coatings can easily form a thicker coat in micrometer scale without cracks and much lower curing temperature is needed for sintering of oxide layers. And moreover, the hybrid sol-gel system has much more flexibility in adaptation of anti-corrosion additives such as inhibitors, pigments etc. so the overall corrosion resistance ability of the sol-gel system can be substantially improved.

The resulting aqueous solution or dispersion makes the resultant coating film well-proportioned and have better performances on resistance against corrosion, humidity and organic solvents, and the surface conductivity is increased which is beneficial for optional electro-coating and also for electrostatic discharge and furthermore the paintability is also improved.

For each component of compositions of this invention including indispensable and optional ones, below follows more detailed description.

<Organosilane>

The term "organosilane" in the context of this invention is to define any organic derivative of a silane wherein at least one carbon atom is covalently bound to the silicon atom of the silane. According to this invention, the group providing the Si—C bond is considered to be a non-hydrolyzable substituent.

Furthermore, said organosilane component according to this invention has a molecular weight of less than 400 g/mol.

According to the invention, the coating composition comprises at least one organosilane. And the said one organosilane preferably comprises at least one non-hydrolyzable substituent selected from amino-functional, vinyl-functional, epoxy-functional and hydroxyl-functional groups. These functional groups may improve the compatibility of the organic-inorganic hybrid coating provided by compositions of this invention with subsequent organic paints.

More preferably, the said organosilane is selected from a compound according to the following general structure (I):

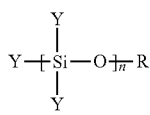

(I)

wherein n is from 1 to 3; residue R is selected from C1 to C6 and preferably C1 to C3 alkyl groups; residue Y is selected from alkyl groups with not more than 10 carbon atoms carrying at least one epoxy, amino, hydroxyl, vinyl and/or thiol group wherein the residues Y are selected mutually independent from each other.

In an especially preferred embodiment the composition of this invention comprises organosilanes that are selected from vinyltriacetoxysilane, vinyltrialkoxysilanes, aminoethyltrialkoxysilanes, aminopropylalkoxysilanes, bis-trialkoxysilypropylamines, aminoethylaminopropyltrialkoxysilanes, aminoethylaminopropyltrialkoxysilanes, mercaptopropyltrialkoxysilanes, bis-trialkoxysilylpropyl-tetrasulfide, 3-glycidoxypropyltrialkoxysilanes, wherein the alkoxy groups have not more than 3 carbon atoms.

<Water Soluble and/or Water Dispersible Silane-Functional Oligomer>

The term "water soluble and/or water dispersible" is used to define a physical status that the solute is dissolved in water or is evenly distributed in the water phase in the form of small particles with an average particle diameter of less than 10 μm. The average particle diameter herein is to be determined from cumulative frequency distribution curves derived from dynamic light scattering methods and equals the D50 value at which 50 Vol. wt.-% of the particles have a diameter smaller than the respective value.

The term "silane-functional oligomer" is to further define a compound that is the resultant product from polymerization or condensation reaction having a weight-average molecular weight (weight average molecular weight Mw, as determined by GPC) of at least 400 g/mol and less than 10,000 g/mol while the resultant product comprises terminal silyl groups.

Within the aqueous composition of this invention the silane-functional oligomers may undergo manifold hydrolyzation and/or condensation reactions in the presence of water and the other mandatory components.

Due to their synthesis the oligomers reveal a backbone that is constituted by multiple repeating units. In this respect, the said backbone of a silane-functional oligomer according to the underlying invention is preferably selected from polyurethanes, poly-acrylates, poly-esters and/or poly-ethers.

The said water soluble and/or water dispersible silane-functional poly-urethane is preferably obtained through the reaction of at least one diisocyanate, at least one hydroxyl-functional tertiary amine, at least one amino-functional organosilane and at least one polyol selected from alkane diols, polyether diols, polyester diol and polycarbonate diols. The silane functional polyurethanes preferably have a molecular weight of 400 to 4000 g/mol.

The hydroxyl-functional tertiary amine is preferably selected from compounds according to the general formula $(R_1)_2N(OH)R_2$, with $R_1$ as C1~C6 linear or branched alkyl group, $R_2$ as C1~C12 linear or branched alkyl group.

The amino-functional organosilanes for the reaction to constitute the silane-functional poly-urethane are preferably selected from vinyltriacetoxysilane, vinyltrialkoxysilanes, aminoethyltrialkoxysilanes, aminopropylalkoxysilanes, bis-trialkoxysilypropylamines, aminoethylaminopropyltrialkoxysilanes, aminoethylaminopropyltrialkoxysilanes, mercaptopropyltrialkoxysilanes, bis-trialkoxysilylpropyl-tetrasulfides, 3-glycidoxypropyltrialkoxysilanes, wherein the alkoxy groups have not more than 3 carbon atoms.

The water-dispersible silane functional polyurethane is preferably synthesized through a process comprising at least the following two steps:

i) hydroxyl-functional tertiary amines, amino-functional organosilanes and polyols are pre-mixed under water-free conditions, and ii) the diisocyanates are added dropwise to this pre-mixture while the temperature is kept in a range of from 60° C.~90° C.

The term "water-free" mentioned in this context refers to the condition that the content of water is no more than 200 ppm.

As a preferred example to prepare the water-dispersible silane functional polyurethane, all components for the synthesis are mixed according to the following weight percentages:

5 wt.-% to 60 wt.-% diisocyanates
1 wt.-% to 20 wt.-% hydroxyl-functional tertiary amine
1 wt.-% to 20 wt.-% amino silanes
5 wt.-% to 40 wt.-% one or more selected from polyols
0 wt.-% to 20 wt.-% auxiliary compounds The total amount of these components for synthesis of the said silane functional polyurethane oligomer is set as 100 wt.-%.

The molar ratio of —NCO group to —OH group in the mixture of components is preferably above 1, but preferably no more than 2.5.

The said water soluble and/or water dispersible silane-functional poly-acrylates are preferably obtained through the reaction of at least one (meth)acrylate, vinyl-functional silane, and acrylates having a tert-amino substituent.

The said (meth)acrylate are preferably selected from methyl methacrylate, butyl methacrylate, ethyl hexyl acrylate.

The said vinyl-functional silane is preferably selected from vinyltriethoxy silane, vinyltrimethoxy silane.

The said acrylates having a tert-amino substituent are preferably selected from 2-(diethylamino)ethyl methacrylate.

The silane functional poly-acrylates preferably has a molecular weight of 1000 to 8000 g/mol.

Conventional means known to the skilled person can be applied to initiate the polymerization reaction based on acrylates.

The said water soluble and/or water dispersible silane-functional epoxy resin is preferably obtained through the reaction of at least one epoxy resin, at least one amino-functional organosilane, and a multifunctional compound having at least two hydroxyl and/or amino groups. The silane functional epoxy resin preferably has a molecular weight of 400 to 2000 g/mol.

To prepare it, it is preferred to dissolve the epoxy resin within an inert solvent at elevated temperature and then add the mixture of amino silanes and hydroxyl amines.

The mixture is maintained until the reaction has finished. The resulting product can be stored under non humid conditions.

The molar ratio of —$NH_2$ groups to epoxy groups within the mixture preferably ranges from 0.25 to 2.2.

Most preferably, the epoxy resin is selected from bisphenol A type with a number average molecular weight of less than 2000.

<Water-Soluble Compound of Elements Zr and/or Ti>

One or more selected from fluorozirconate acid, fluorotitanic acid, zirconium acetate complex and titanium acetate complex could be used as the metallic chelated compound. Preferably, the water-soluble compound of elements Zr and/or Ti is selected from $H_2TiF_6$, $H_2ZrF_6$, $Zr(OCOCH_3)_4$ and $Ti(OCOCH_3)_4$.

The molar ratio of element Si to the sum of the elements Zr and/or Ti is from 10 to 500, preferably from 40 to 100.

The amount of the water-soluble compound of the elements Zr and/or Ti in the overall composition is from 0.1 wt.-% to 5 wt.-%, preferably from 0.2 wt.-% to 2 wt.-% with respect to the elements Zr and Ti.

<pH Value Regulator>

The pH value of the composition is acidic. The most preferred pH value lies within the range of 3 to 6. To adjust the pH value of the composition of this invention, pH value regulators might be added. The person skilled in the art knows that these types of pH value regulators immediately react through dissociation and are as such not detectable in the composition. Preferably, it is selected from acetic acid and phosphonic acids.

<Optional Water Soluble and/or Water Dispersible Resin>

Optionally, water soluble and/or water dispersible resins are added to provide toughness as organic part of the coating without chemical binding to any inorganic part. The commonly used hydrophilic resin in aqueous coating could be selected in this invention. Preferably, it is selected from polyurethane, polyurethane dispersion and acrylic hybrid.

<Additives>

Furthermore, common coating additives may be selected in this invention to confer desired additional properties. Such additives may be selected from de-foaming agents, such as non-ionic surfactants, leveling agents to yield a defect-free coating film, and anti-friction agents, such as waxes. These type of agents are commonly known to the skilled person. In a preferred embodiment the weight fraction of these types of agents with respect to the water soluble and/or water-dispersible silane-functional oligomer should not exceed 10 wt.-%.

<Coating Composition>

In a coating composition of this invention the above-mentioned components are preferably present in the following weight percentages:
  5 wt.-% to 30 wt.-% organosilane with at least one hydrolyzable substituent;
  5 wt.-% to 30 wt.-% water soluble and/or water-dispersible silane-functional oligomer;
  0.5 wt.-% to 10 wt.-% water soluble compound of elements Zr and/or Ti;
  1 wt.-% to 5 wt.-% pH value regulator;
  0 wt.-% to 20 wt.-% water soluble and/or water-dispersible resin;
  0 wt.-% to 5 wt.-% additives,
The total amount by weight of these components adds to 100 wt.-%.

The aqueous coating composition may also further comprise at least one silane according to Formula (II):

wherein R' is selected from C1 to C6 alkyl groups.

<Preparation of Coating Composition>

The organosilane as well as the silane functional oligomer hydrolyzes in water and manifold condensation reactions may occur at a pH value of about 3~6.

In a preferred embodiment of this invention, the coating composition is obtainable through the following process: the organosilane is dissolved in acidic water and the pH value is thereafter adjusted to about 3 to 6 by a pH value regulator. In this solution the acidified silane functional oligomer is dispersed or dissolved. The other components and additives can be dispersed or dissolved in the solution mixture either before or after the dispersion or dissolving of the silane containing agents.

<Process of Electroless Metal Surface Treatment>

The resultant aqueous coating composition can be applied on metal surfaces with conventional means like dipping, spraying, electroplating etc.

Preferably, the said coating composition in this invention is applicable for metal substrates of hot dip galvanized steel, electrolytically galvanized steel, steel, iron, zinc, aluminum and aluminum alloys.

The process of electroless metal surface treatment preferably comprises the following subsequent steps (1)-(6):
  1) degreasing the metal surface;
  2) rinsing with water;
  3) drying the metal surface;
  4) pre-treatment the metal surface with a coating composition of this invention;
  5) curing the applied coating composition;
  6) subsequent application of an organic paint.
wherein, during the step (5), the temperature is preferably at least 70° C., but not more than 240° C., preferably not more than 150° C.

<Coating Film of Pre-Treatment on Metal Surface>

The coating weight of the primer coating applied through the above-described process of this invention is preferably at least 0.3 g/m², preferably at least 0.7 g/m², but preferably no more than 1.5 g/m² based on the overall coating weight.

DESCRIPTION OF EMBODIMENT

Below examples are used to further illustrate the preparation of coating compositions of this invention as well as their performance as a primer coating for a subsequently applied cathodic electrodipcoating.

All raw materials used in the below examples are commercially available.

Below is listed a provider of each raw material:

All silane compounds used in examples are purchased from Dow Corning;

Hexandiol is purchased from BASF Chemical;
Polyurethane is purchased from Dainippon Ink and Chemicals (product code: DIC-8125);
Polyester diol is purchased from Henkel (product code: K-3320);
Polyethylene glycol (number average molecular weight 300) is purchased from Dow Chemical;
Polyethylene glycol (number average molecular weight 600) is purchased from Dow Chemical;
Acrylic hybrid compound is purchased from Henkel (product code: AR/ST 100-080);
Epoxy resin is purchased from Dow Chemical (product code: DER 661);
All other raw materials are purchased from Aladdin Chemical.

EXAMPLES

Within the following examples all percentages of the components refer to weight percentages.

Example 1

The First Step (Preparation of the Silane-Functional Oligomer)

13.5 g 1,6-Hexandiol,
2.5 g Dimethyl ethanol amine,
9.1 g Aminoethyltrimethoxysilane,
18.5 g 1-Methyl-2-pyrrolidone Combined and heated the above to 75° C. and gradually added 39.3 g methylene Bis-(4-cyclohexylisocyanate) and maintained at 70° C. to 80° C. for 2 hours. Poured the addition mixture into 100 g DI water contained 5 g acetic acid and stirred for 30 minutes. The pH value was adjusted to around 6.0.

The Second Step (Preparation of the Coating Composition)

112 g of the resultant solution from the first step was dispersed into 596 g water mixture contained 1.8 wt.-% tetraethyl orthosilicate, 3 wt.-% aminoethyltriethoxysilane, 1 wt.-% Bis-1,2-(triethoxysilyl) ethane, 3 wt.-% 3-glycidyloxypropyltriethoxysilane, 1 wt.-% vinyl triethoxyl silane and 1.6 wt.-% $H_2ZrF_6$. Adjusted the pH value to around 5.0 with acetic acid and kept mixing for 3~12 hours, then added 6 wt.-% polyurethane.

Example 2

The First Step (Preparation of the Silane-Functional Oligomer)

140.3 g Polyester diol
19.7 g Dimethyl ethanol amine
12.0 g Aminoethyltrimethoxysilane
44.0 g 1-Methyl-2-pyrrolidone Combined and heated the above to 75° C. and gradually added 78.6 g methylene Bis-(4-cyclohexylisocyanate) and kept the addition mixture at 70° C. to 80° C. for 2 hours. Poured the addition mixture into 350 g DI water containing 8.1 g acetic acid and kept stirring for 30 minutes.

The Second Step (Preparation of the Coating Composition)

112 g of the resultant solution from the first step was dispersed into 596 g water mixture containing 1.8 wt.-% tetraethyl orthosilicate, 3 wt.-% aminoethyltriethoxysilane, 1 wt.-% Bis-1,2-(triethoxysilyl) ethane, 3 wt.-% 3-glycidyloxypropyltriethoxysilane, 1 wt.-% vinyl triethoxyl silane and 1.6 wt.-% $H_2ZrF_6$. Adjusted the pH value to around 5.0 with acetic acid and kept mixing for 3 to 12 hours, then added 6 wt.-% polyurethane.

Example 3

The First Step (Preparation of the Silane-Functional Oligomer)

30 g Polyethylene glycol (PEG 300)
49.8 g Polyester diol
18.1 g Aminoethyltrimethoxysilane
37.0 g 1-Methyl-2-pyrrolidone Combined and heated the above to 75° C. and gradually added 78.6 g methylene Bis-(4-cyclohexylisocyanate) and kept at 70° C. to 80° C. for 2 hours. Poured the addition mixture into 310 g DI water containing 2 g acetic acid and kept stirring for 30 minutes.

The Second Step (Preparation of the Coating Composition)

112 g of the resultant solution from the first step was dispersed into 596 g water mixture containing 1.8 wt.-% tetraethyl orthosilicate, 3 wt.-% aminoethyltriethoxysilane, 1 wt.-% Bis-1,2-(triethoxysilyl) ethane, 3 wt.-% 3-glycidyloxypropyltriethoxysilane, 1 wt.-% vinyl triethoxyl silane and 1.6 wt.-% $H_2ZrF_6$. Adjusted the pH value to around 3.0 with phosphonic acid. Kept mixing for 3 to 12 hours, then add 6 wt.-% polyurethane.

Example 4

The First Step (Preparation of the Silane-Functional Oligomer)

30 g Polyethylene glycol (PEG 600)
5.9 g 1,6-hexandiol,
8.1 g Aminoethyltrimethoxysilane,
37.0 g Ethylene glycol di-methylether Combined and heated the above to 75° C. and gradually added 78.6 g n-methyl methylene Bis-(4-cyclohexylisocyanate) and kept at 70° C. to 80° C. for 2 hours. Poured the addition mixture into 310 g DI water containing 2 g acetic acid and kept stirring for 30 minutes.

The Second Step (Preparation of the Coating Composition)

112 g of the resultant solution from the first step was dispersed into 596 g water mixture, which contained 1.8 wt.-% tetraethyl orthosilicate, 3 wt.-% aminoethyltriethoxysilane, 1 wt.-% Bis-1,2-(triethoxysilyl) ethane, 3 wt.-% 3-glycidyloxypropyltriethoxysilane, 1 wt.-% vinyl triethoxyl silane and 1.6 wt.-% $H_2ZrF_6$. Adjusted the pH value to around 4.0 with acetic acid. Kept mixing for 3 to 12 hours, then added 6 wt.-% polyurethane.

Example 5

The First Step (Preparation of the Silane-Functional Oligomer)

30 g Polyethylene glycol (PEG 300),
49.8 g Polyester diol
18.1 g Aminoethyltrimethoxysilane
37.0 g 1-Methyl-2-pyrrolidone Combined and heated the above to 75° C. and gradually added 78.6 g methylene Bis-(4-cyclohexylisocyanate) and kept at 70° C. to 80° C. for 2 hours. Poured above mixture into 310 g DI water containing 2 g acetic acid and kept stirring for 30 minutes.

The Second Step (Preparation of the Coating Composition)

224 g of the resultant solution from the first step was dispersed into 596 g water mixture containing 1.8 wt.-% tetraethyl orthosilicate, 3 wt.-% aminoethyltriethoxysilane, 1wt.-% Bis-1,2-(triethoxysilyl) ethane, 3 wt.-% 3-glycidyloxypropyltriethoxysilane, 1 wt.-% vinyl triethoxyl silane and 1.6 wt.-% $H_2ZrF_6$. Adjusted the pH value to around 4.5 with acetic acid. Kept mixing for 3 to 12 hours, then added 12 wt.-% polyurethane.

Example 6

The First Step (Preparation of the Silane-Functional Oligomer)

140.3 g Polyester diol
19.7 g Dimethyl ethanol amine
12.0 g Aminoethyltrimethoxysilane
44.0 g 1-Methyl-2-pyrrolidone Combined and heated the above to 75° C. and gradually added 78.6 g methylene Bis-(4-cyclohexylisocyanate) and kept at 70° C. to 80° C. for 2 hours. Poured above mixture into 350 g DI water containing 8.1 g acetic acid and kept stirring for 30 minutes.

The Second Step (Preparation of the Coating Composition)

112 g of the resultant solution from the first step was dispersed into 596 g water mixture containing 1.8 wt.-% tetraethyl orthosilicate, 3 wt.-% aminoethyltriethoxysilane, 1 wt.-% Bis-1,2-(triethoxysilyl) ethane, 3 wt.-% 3-glycidyloxypropyltriethoxysilane, 1 wt.-% vinyl triethoxyl silane and 1.6 wt.-% $H_2ZrF_6$. Adjusted the pH value to around 3.5 with phosphonic acid. Kept mixing for 3 to 12 hours, then added 4 wt.-% polyurethane.

Example 7

The First Step (Preparation of the Silane-Functional Oligomer)

140.3 g Polyester diol
19.7 g Dimethyl ethanol amine
12.0 g aminoethyltrimethoxysilane
44.0 g 1-Methyl-2-pyrrolidone Put all above components into a flask and heated the mixture to 75° C. and then gradually added 78.6 g methylene Bis-(4-cyclohexylisocyanate) and kept at 70° C. to 80° C. for 2 hours. Poured above mixture into 350 g DI water containing 8.1 g acetic acid and kept stirring for 30 minutes.

The Second Step (Preparation of the Coating Composition)

112 g of the resultant solution from the first step was dispersed into 596 g water mixture containing 1.8 wt.-% tetraethyl orthosilicate, 3 wt.-% aminoethyltriethoxysilane, 1 wt.-% Bis-1,2-(triethoxysilyl) ethane, 3 wt.-% 3-glycidyloxypropyltriethoxysilane, 1 wt.-% vinyl triethoxyl silane and 1.6 wt.-% $H_2ZrF_6$. Adjusted the pH value to around 3.5 with acetic acid. Kept mixing for 3 to 12 hours, then added 12 wt.-% polyurethane.

Example 8

The First Step (Preparation of the Silane-Functional Oligomer)

140.3 g Polyester diol
19.7 g Dimethyl ethanol amine
12.0 g aminoethyltrimethoxysilane
44.0 g 1-Methyl-2-pyrrolidone Put all above components into a flask and heated the mixture to 75° C. and then gradually added 78.6 g methylene Bis-(4-cyclohexylisocyanate) and kept at 70° C. to 80° C. for 2 hours. Poured above mixture into 350 g DI water containing 8.1 g acetic acid and kept stirring for 30 minutes.

The Second Step (Preparation of the Coating Composition)

112 g of the resultant solution from the first step was dispersed into 596 g water mixture containing 1.8 wt.-% tetraethyl orthosilicate, 3 wt.-% aminoethyltriethoxysilane, 1 wt.-% Bis-1,2-(triethoxysilyl) ethane, 3 wt.-% 3-glycidyloxypropyltriethoxysilane, 1 wt.-% vinyl triethoxyl silane and 1.6 wt.-% $H_2ZrF_6$. Adjusted the pH value to around 5.0 with phosphonic acid. Kept mixing for 3 to 12 hours, then added 8 wt.-% Polyurethane and acrylic hybrid compound.

Example 9

The First Step (Preparation of the Silane-Functional Oligomer)

Heated a flask containing 200 g diethylene glycol methylether to 130° C. and used $N_2$ to purge the flask.

Then, in a separated container, mixed:
20 g Methyl methacrylate
30 g 3-(ethyl,hexyl)acrylate
40 g butyl acrylate
40 g styrene
10 g vinyl triethoxy silane
15 g 2-(Diethylamino)ethyl methacrylate
0.5 g Ethanethiol
3.5 g di-tert. butyl peroxide.

Gradually metered the mixture into the flask over 3 hours. Kept furthermore 1 hour at 130° C. until the feed was complete. Cooled the flask to 80° C. and dispersed the product into 500 g DI water containing 6.5 g acetic acid.

The Second Step (Preparation of the Coating Composition)

112 g of the resultant solution from the first step was dispersed into 596 g water mixture containing 1.8 wt.-% tetraethyl orthosilicate, 3 wt.-% aminoethyltriethoxysilane, 1 wt.-% Bis-1,2-(triethoxysilyl) ethane, 3 wt.-% 3-glycidyloxypropyltriethoxysilane, 1 wt.-% vinyl triethoxy silane and 1.6 wt.-% $H_2ZrF_6$. Adjusted the pH value to around 4.0 with acetic acid. Kept mixing for 3 to 12 hours, then added 6 wt.-% polyurethane.

Example 10

The First Step (Preparation of the Silane-Functional Oligomer)

Heated a flask containing 50 g epoxy resin DER 661 and 30 g diethylene glycol methylether to 60° C. until DER 661 was dissolved or melted. Then added 19 g aminoethyltriethoxysilane and 10 g poly (5) oxyethylene tallow amine into the flask and kept the reaction mix for 1 more hour at 60° C. Dispersed the mixture into 180 g DI water containing 6.0 g acetic acid.

The Second Step (Preparation of the Coating Composition)

112 g of the resultant solution from the first step was dispersed into 596 g water mixture containing 1.8 wt.-% tetraethyl orthosilicate, 3 wt.-% aminoethyltriethoxysilane, 1 wt.-% Bis-1,2-(triethoxysilyl) ethane, 3 wt.-% 3-glycidyloxypropyltriethoxysilane, 1 wt.-% vinyl triethoxy silane and 1.6 wt.-% $H_2ZrF_6$. Adjusted the pH value to around 4.0 with acetic acid. Kept mixing for 3 to 12 hours, then added 6 wt.-% polyurethane.

Comparative Example

Into 585 g DI water was added:
1.8 wt.-% tetraethyl orthosilicate,
3 wt.-% aminoethyltriethoxysilane,
1 wt.-% Bis-1,2-(triethoxysilyl) ethane
3 wt.-% 3-glycidyloxypropyltriethoxysilane
1 wt.-% vinyl triethoxy silane
1.6 wt.-% $H_2ZrF_6$
Adjusted the pH value to 4.0 with acetic acid. Kept mixing for 3 to 12 hours and then added 8 wt.-% polyurethane.
<Method of Test>

The compositions obtained from examples 1 to 10 and the comparative example were tested to evaluate their performance of anti-corrosion, surface conductivity, humidity resistance, paintability, solvent resistance after coating onto metal substrates as well as the shelf life of the composition product.

Corrosion Resistance

Three tests are carried out to evaluate the performance of corrosion resistance of the invented composition according to ASTM B117 (Standard Practice for Operating Salt Spray (Fog) Apparatus).

In Test (1), the salt spray lasts for 96 hours and it is accepted if the rust ratio of the coated substrate is ≤5 wt.-%.

In Test (2), the salt spray lasts for 72 hours and further includes steps of alkaline cleaning with Parker FC-364S cleaner at 50° C. for 2 minute and spraying Parker FC-364S cleaner at 50° C. for 3 minute. It is accepted if the rust ratio of the coated substrate is ≤5 wt.-%.

In Test (3), the salt spray lasts for 48 hour after 6-8 mm Erichson Cupping and it is accepted if the rust ratio of the coated substrate is ≤5 wt.-%.

Surface Conductivity

Conductivity resistance is test by Loresta MP-T 360 instrument.

16 spots on 300*300 mm panels coated according to the examples were measured. Tables show the number of spots that reveal a surface resistance of not more than 1 mΩ. Coated panels with more than 13 spots having a surface resistance that fulfill that condition are regarded as acceptable.

Humidity Resistance

Coat the composition in this invention onto stack flat panels and put it into environment with temperature of 49° C. and humidity of 98% for 120 hours. It is acceptable if no dark spots and piebald is found and the white rust ratio is ≤5 wt.-% and the value of chromatism ΔE≤3.

Paintability

Top Coated with below three Paints and adhesion loss is calculated based on the film percentage loss in cross hatched area.

In Test (1), paint (1) is powder paint (Akzo EA05BH) and the dried film has thickness of 40 μm to 60 μm and the cross-hatch is done with 100 grids of size 1 mm×1 mm. It is acceptable if no film removed by tape peeling.

In Test (2), paint (2) is solvent borne paint (amino alkyd paint) and the dried film has thickness of around 20 μm and a reverse impact with energy of 5 J was brought to bear. It is acceptable if no film crack occurs after impact.

In Test (3), paint (3) is coil coating paint (polyester) and the dried film has thickness of around 20 μm and the 6 mm Erichson cupping is added to the cross-hatch with 100 grids of size 1 mm×1 mm. It is acceptable if no film is removed by tape peeling.

Solvent Resistance

Two tests are done to evaluate the solvent resistance of the composition after coating onto the metal substrates.

In Test (1), the prime coating is rubbed by the solvent of 80 wt.-% ethanol with load of 1 kilogram for 30 times. It is acceptable if no film is removed and the value of chromatism ΔE≤2.

In Test (2), the prime coating is rubbed by the solvent of methyl/ethyl ketone with load of 1 kilogram for 20 times. It is acceptable if no film is removed and the value of chromatism ΔE≤2.

Shelf Life Test

The term "shelf life" denotes the length of time that a commodity may be stored without becoming unfit for use or consumption. In this invention, the shelf life is tested by two ways.

The first is to prepare samples and let it age in a hot box with temperature of 40° C. for one month. The shelf life is at least one month at 40° C. if the performance does not turn worse in either one of corrosion resistance, surface conductivity, paintability, solvent resistance, humidity resistance.

The second is to prepare samples and let it age in a hot box with temperature of room temperature for three months. The shelf life is at least three months at room temperature if the performance does not turn worse in either one of corrosion resistance, surface conductivity, paintability, solvent resistance, humidity resistance.

Effect Example

After preparing the said coating composition according to weight ratio and method described in Example 1~10 as well as in Comparative Example, it is used to treat the hot dip galvanized steel following the common-used way, i.e.
(i) Clean the metal surface;
(ii) Dry the metal surface;

(iii) coating;

(iv) Dry the metal surface, and make the tests above-mentioned, i.e. corrosion resistance, surface conductivity, humidity resistance, paintability and solvent resistance of the coating film of the composition as well as the shelf life of the composition product. The test results are listed in Tables 1 to 3.

TABLE 1

Corrosion resistance and paintability

| Example | Corrosion Resistance | | | Paintability | | |
|---|---|---|---|---|---|---|
| | Test (1) | Test (2) | Test (3) | Test (1) | Test (2) | Test (3) |
| 1 | 0.5 wt.-% | 0 | 0 | 0 | 0 | 0.5 wt.-% |
| | 0 | 0.5 wt.-% | 0 | 0 | 0 | 0 |
| | 0 | — | 0 | — | — | 0 |
| 2 | 1 wt.-% | 0 wt.-% | 0 | 0 | 0 | 1 wt.-% |
| | 0.5 wt.-% | 1 wt.-% | 0 | 0 | 1 wt.-% | 2 wt.-% |
| | 0 | — | 0 | — | — | 0 |
| 3 | 1 wt.-% | 0 | 0 | 0 | 0.5 wt.-% | 1 wt.-% |
| | 0 | 0.5 wt.-% | 0 | 0 | 0 | 1 wt.-% |
| | 1 wt.-% | — | 0 | — | — | 0 |
| 4 | 0.5 wt.-% | 1 wt.-% | 0 | 0 | 1 wt.-% | 0 |
| | 0.5 wt.-% | 0 | 0 | 0 | 3 wt.-% | 0 |
| | 0 | — | 0 | — | — | 0 |
| 5 | 1 wt.-% | 1 wt.-% | 0 | 0 | 0 | 1 wt.-% |
| | 0 | 2 wt.-% | 0 | 0 | 0 | 3 wt.-% |
| | 0 | — | 0 | — | — | 0 |
| 6 | 1 wt.-% | 0 | 1 wt.-% | 0 | 0 | 2 wt.-% |
| | 0 | 0 | 0 | 0 | 0 | 4 wt.-% |
| | 0 | — | 0 | — | — | 0 |
| 7 | 0 | 0 | 0 | 0 | 0 | 0 |
| | 0 | 0 | 1 wt.-% | 0 | 0 | 0 |
| | 1 wt.-% | — | 0 | — | — | 0 |
| 8 | 0 | 0 | 0 | 0 | 0 | 0 |
| | 0 | 0 | 1 wt.-% | 0 | 1 wt.-% | 0.5 wt.-% |
| | 0 | — | 0 | — | — | — |
| 9 | 0 | 0 | 0 | 0.5 wt.-% | 0 | 1 wt.-% |
| | 0 | 0 | 0 | 1 wt.-% | 0.5 wt.-% | 3 wt.-% |
| | 0 | — | 1 wt.-% | — | — | — |

TABLE 1-continued

Corrosion resistance and paintability

| Example | Corrosion Resistance | | | Paintability | | |
|---|---|---|---|---|---|---|
| | Test (1) | Test (2) | Test (3) | Test (1) | Test (2) | Test (3) |
| 10 | 0 | 0 | 0 | 0 | 0 | 0 |
| | 0 | 0 | 0 | 0 | 1 wt.-% | 2 wt.-% |
| | 0 | — | 0 | — | — | — |
| Comparative | 1 wt.-% | 3 wt.-% | 0 | 0 | 10 wt.-% | 10 wt.-% |
| | 3 wt.-% | 1 wt.-% | 1 wt.-% | 0 | 5 wt.-% | 20 wt.-% |
| | 1 wt.-% | — | 0 | — | — | — |

TABLE 2

Humidity & solvent resistance and surface conductivity

| Example | Humidity Resistance | Surface Conductivity | Ethanol Resistance ($\Delta E$) | Methyl/Ethyl Ketone Resistance ($\Delta E$) |
|---|---|---|---|---|
| 1 | 4 wt.-% | 15/16 | 0.80 | 0.60 |
| 2 | 3 wt.-% | 16/16 | 0.70 | 1.00 |
| 3 | 1.5 wt.-% | 14/16 | 0.80 | 0.50 |
| 4 | 1 wt.-% | 16/16 | 0.16 | 0.40 |
| 5 | 0 | 15/16 | 0.07 | 0.50 |
| 6 | 1 wt.-% | 16/16 | 0.20 | 0.80 |
| 7 | 0 | 16/16 | 1.00 | 0.80 |
| 8 | 0 | 16/16 | 0.30 | 0.20 |
| 9 | 0 | 15/16 | 0.01 | 0.20 |
| 10 | 0 | 15/16 | 0.20 | 0.08 |
| Comparative | 4 wt.-% | 15/16 | 1.50 | 1.00 |

Table 3 shows result of re-test the properties including corrosion resistance, surface conductivity, paintability, humidity resistance and solvent resistance after the samples are kept in a hot box with temperature of 40° C. for one month. The contrast of performance of each example shows shelf life, i.e. the stability of product.

TABLE 3

| Example | Corrosion Resistance | | | Paintability | | |
|---|---|---|---|---|---|---|
| | Test (1) | Test (2) | Test (3) | Test (1) | Test (2) | Test (3) |
| 1 | 2 wt.-% | 2 wt.-% | 0 | 0 | 1 wt.-% | 1 wt.-% |
| | 0 | 1.5 wt.-% | 1.5 wt.-% | 0 | 2.5 wt.-% | 3 wt-% |
| | 1 wt.-% | — | — | — | — | — |
| 2 | 2 wt.-% | 0 wt.-% | 0 | 0 | 0 | 1.5 wt.-% |
| | 4 wt.-% | 1 wt.-% | 1 wt.-% | 0 | 1 wt.-% | 2 wt.-% |
| | 3 wt.-% | — | — | — | — | — |
| 3 | 4 wt.-% | 1 wt.-% | 2 wt-% | 0 | 2 wt.-% | 0 wt.-% |
| | 4 wt.-% | 2 wt.-% | 0 | 0 | 1 wt.-% | 2 wt.-% |
| | 2.5 wt.-% | — | — | — | — | — |
| 4 | 1 wt.-% | 0 | 0 | 0 | 1 wt.-% | 2 wt.-% |
| | 3 wt.-% | 0 | 0 | 0 | 4 wt.-% | 6 wt.-% |
| | 4 wt.-% | — | — | — | — | — |
| 5 | 1 wt.-% | 1 wt.-% | 2 wt.-% | 0 | 0 | 1 wt.-% |
| | 0 | 2 wt.-% | 0 | 0 | 0 | 3 wt.-% |
| | 3 wt.-% | — | 1 wt.-% | — | — | 0 |
| 6 | 1 wt.-% | 0 | 1 wt.-% | 0 | 0 | 2 wt.-% |
| | 0 | 0 | 0 | 0 | 0 | 4 wt.-% |
| | 0 | — | 0 | — | — | — |
| 7 | 2 wt.-% | 0 | 0 | 0 | 0 | 0 |
| | 0 | 2 wt.-% | 1 wt.-% | 0 | 0 | 0 |
| | 1 wt.-% | — | 0 | — | 0 | — |

TABLE 3-continued

| Example | | | | | | |
|---|---|---|---|---|---|---|
| 8 | 0 | 1 wt.-% | 0 | 0 | 0 | 0 |
|   | 0 | 0 | 1 wt.-% | 0 | 1 wt.-% | 0.5 wt.-% |
|   | 0 | — | 0 | — | — | — |
| 9 | 0 | 0 | 1 wt.-% | 0.5 wt.-% | 1 wt.-% | 1 wt.-% |
|   | 0 | 0 | 0 | 2 wt.-% | 3 wt.-% | 2 wt.-% |
|   | 0 | — | 1 wt.-% | — | — | — |
| 10 | 0 | 0 | 0 | 0 | 0 | 0 |
|   | 0 | 0 | 0 | 0 | 1 wt.-% | 2 wt.-% |
|   | 0 | — | 2 wt.-% | — | — | — |
| Comparative | 6 wt.-% | 6 wt.-% | 5 wt.-% | 2 wt.-% | 15 wt.-% | 5 wt.-% |
|   | 1.5 wt.-% | 10 wt.-% | 1 wt.-% | 5 wt.-% | 20 wt.-% | 10 wt.-% |
|   | 4 wt.-% | — | 2.5 wt.-% | — | — | — |

| | Test | | | |
|---|---|---|---|---|
| Example | Humidity Resistance | Surface Conductivity | Ethanol Resistance (ΔE) | Methyl/Ethyl Ketone Resistance (ΔE) |
| 1 | 3 wt.-% | 16/16 | 0.60 | 0.50 |
| 2 | 4 wt.-% | 16/16 | 0.08 | 0.20 |
| 3 | 3 wt.-% | 14/16 | 0.50 | 0.80 |
| 4 | 1 wt.-% | 16/16 | 0.20 | 1.00 |
| 5 | 3 wt.-% | 15/16 | 0.07 | 0.50 |
| 6 | 1 wt.-% | 14/16 | 1.20 | 0.80 |
| 7 | 1 wt-% | 15/16 | 1.00 | 0.80 |
| 8 | 0 | 16/16 | 0.30 | 0.20 |
| 9 | 0 | 16/16 | 0.01 | 0.20 |
| 10 | 0 | 16/16 | 0.20 | 0.08 |
| Comparative | 5 wt.-% | 15/16 | 1.50 | 0.80 |

As shown in tables 1 to 3, the coating composition in this invention provide good performances on corrosion resistance, surface conductivity, paintability, humidity and solvent resistance and also reveal a suitable long shelf life. By contrast, the comparative example, wherein no water-dispersible silane functional oligomers are used, shows obvious weakness in corrosion resistance, and paintability as well as with respect to the stability of the product.

What is claimed is:

1. An aqueous coating composition for metal surface pre-treatment having a pH in a range of from 3 to 6, comprising:
   (i) a mixture of 3 or more organosilanes, different from each other, each organosilane having a molecular weight of less than 400 g/mol and each having: at least one non-hydrolyzable substituent selected from the group consisting of amino-functional substituents, vinyl-functional substituents, epoxy-functional substituents, hydroxyl-functional substituents and combinations thereof; and at least one hydrolyzable substituent;
   wherein the mixture of 3 or more organosilanes, different from each other, includes an organosilane having an amino-functional non-hydrolyzable substituent, an organosilane having a vinyl-functional non-hydrolyzable substituent, and an organosilane having an epoxy-functional non-hydrolyzable substituent;
   (ii) at least one water soluble silane-functional oligomer having a backbone synthesized with one of dimethyl ethanol amine, di-tert butyl peroxide or a multifunctional organic compound having at least two hydroxyl functional groups, said backbone selected from polyurethane, polyacrylate, polyester, polyether, and combinations thereof, wherein said silane-functional oligomer (ii) comprises terminal silyl groups; wherein said silane-functional oligomer (ii) has a weight-average molecular weight (Mw) of at least 400 g/mol and less than 4000 g/mol;
   (iii) at least one silane according to Formula (II):

wherein R' is selected from C1 to C6 alkyl groups; and
   (iv) at least one water-soluble compound selected from the group consisting of compounds of the element Zr, compounds of the element Ti, and mixtures thereof;
   wherein the element Si in (i), (ii), and (iii) in the aqueous coating composition has a molar ratio to a sum of the elements Zr and Ti in the aqueous coating composition that ranges from 40:1 to 500:1 and wherein the amount of the water-soluble compound (iv) of the elements Zr and/or Ti in the overall composition is from 0.2 wt. % to 2 wt. %, with respect to the elements Zr and Ti; and
   wherein the aqueous coating composition further comprises a water soluble or water dispersible hydrophilic resin selected from the group consisting of polyurethane, polyurethane dispersion, and acrylic hybrid resin, the water soluble or water dispersible resin being present in an amount ranging from 6 to 12 wt. % of the aqueous coating composition.

2. The aqueous coating composition according to claim 1, wherein the organosilanes having a vinyl-functional non-hydrolyzable substituent are selected from vinyltriacetoxysilane, and vinyltrialkoxysilanes, the organosilanes having an amino-functional non-hydrolyzable substituent are selected from aminoethyltrialkoxysilanes, aminopropylalkoxysilanes, bis-trialkoxysilypropylamines, aminoethylaminopropyltrialkoxysilanes, and aminoethylaminopropyltrialkoxysilanes, and the organosilane having an epoxy-functional non-hydrolyzable substituent is selected from 3-glycidoxypropyltrialkoxysilanes, wherein any alkoxy groups present have not more than 3 carbon atoms.

3. The aqueous coating composition according to claim 1, wherein the water-soluble compound (iv) is selected from the group consisting of hexafluorotitanic acid, hexafluorozirconic acid, zirconium aceto acetate, zirconium acetate, ammonium zirconium carbonate, and mixtures thereof.

4. The aqueous coating composition according to claim 1, wherein the water soluble silane-functional oligomer (ii) comprising terminal silyl groups includes the polyurethane backbone and is a reaction product of:
   a) at least one aliphatic diisocyanate present in an amount of 5 wt. % to 60 wt. %,
   b) dimethyl ethanol amine, present in an amount of 1 wt. % to 20 wt. %,
   c) at least one amino-functional organosilane, present in an amount of 1 wt. % to 20 wt. %, and
   d) at least one polyol, present in an amount of 5 wt. % to 40 wt. %; and
   e) 0 wt. % to 20 wt. % of auxiliary compounds;
   wherein the total amount of components for synthesis of the silane-functional oligomer is 100 wt. %.

5. The aqueous coating composition according to claim 4, wherein said silane-functional oligomer (ii) comprising terminal silyl groups is obtained through a process wherein
   i) said at least one b) monohydroxyl-functional tertiary amines, c) amino-functional organosilanes and d) polyols are pre-mixed under water-free conditions thereby forming a pre-mixture, and
   ii) the at least one a) diisocyanates are added dropwise to the pre-mixture while the temperature is kept in a range of from 60° C.-90° C. reacting the pre-mixture with the diisocyanates to provide the silane-functional oligomer (ii) comprising terminal silyl groups; and thereafter hydrolyzing the silyl groups by adding water and acid.

6. The aqueous coating composition according to claim 5, wherein the c) amino-functional organosilanes in step i) are selected from aminopropyltrialkoxysilanes, aminophenyltrialkoxysilanes, aminopropylmethyldialkoxysilanes, wherein the alkoxy groups have not more than 3 carbon atoms.

7. The aqueous coating composition according to claim 4, wherein the at least one polyol is selected from alkane diols, polyether diols, polyester diols and combinations thereof.

8. The aqueous coating composition according to claim 1, wherein the water soluble silane-functional oligomer (ii) comprising terminal silyl groups includes the polyacrylate backbone and is a reaction product of:
   a) at least two (meth)acrylates,
   b) at least one vinyl-functional silane,
   c) at least one tertiary amine acrylate,
   d) styrene, and
   di-tert, butyl peroxide;
   wherein a) comprises at least one methacrylate and at least one acrylate.

9. The aqueous coating composition according to claim 8, wherein the a) at least two (meth)acrylates, is selected from the group consisting of methyl methacrylate, butyl methacrylate, ethyl hexyl acrylate, and mixtures thereof;
   the b) at least one vinyl-functional silane is selected from the group consisting of vinyltriethoxy silane, vinyltrimethoxy silane, and mixtures thereof; and
   the c) at least one tertiary amine acrylate is 2-(diethylamino)ethyl methacrylate.

10. The aqueous coating composition according to claim 1, wherein the water soluble silane-functional oligomer (ii) comprising terminal silyl groups includes the polyurethane backbone and is a reaction product of:
    a) at least one aliphatic diisocyanate,
    b) at least one amino-functional trialkoxysilane, and
    c) at least one diol selected from aliphatic diols, polyester diols and mixtures thereof; and
    d) optionally at least one polyether polyol;
    wherein —NCO group:—OH group molar ratio is greater than 1 but no more than 2.5.

11. The aqueous coating composition according to claim 10, wherein the polyether polyol is present as polyethylene glycol.

12. A process for electroless coating of metal substrates wherein the metal substrate is contacted with the aqueous coating composition according to claim 1.

13. The process according to claim 12, wherein the metal substrates are selected from hot dip galvanized steel, electrolytically galvanized steel, steel, iron, zinc, aluminum and aluminum alloys.

14. A metal substrate coated with the aqueous coating composition according to claim 1.

15. An aqueous coating composition for metal surface pre-treatment having a pH in a range of from 3 to 6, comprising:
    (i) a mixture of 3 or more organosilanes, different from each other, each organosilane having a molecular weight of less than 400 g/mol and each having: at least one non-hydrolyzable substituent selected from the group consisting of amino-functional substituents, vinyl-functional substituents, epoxy-functional substituents, hydroxyl-functional substituents and combinations thereof; and at least one hydrolyzable substituent;
    wherein the mixture of 3 or more organosilanes, different from each other, includes an organosilane having an amino-functional non-hydrolyzable substituent, an organosilane having a vinyl-functional non-hydrolyzable substituent, and an organosilane having an epoxy-functional non-hydrolyzable substituent;
    (ii) at least one water soluble silane-functional oligomer having a backbone synthesized with one of dimethyl ethanol amine, di-tert butyl peroxide or a multifunctional organic compound having at least two hydroxyl functional groups, said backbone selected from polyurethane, polyacrylate, polyester, polyether, and combinations thereof, wherein said silane-functional oligomer (ii) comprises terminal silyl groups; wherein said silane-functional oligomer (ii) has a weight-average molecular weight (Mw) of at least 400 g/mol and less than 4000 g/mol;
    (iii) at least one silane according to Formula (II):

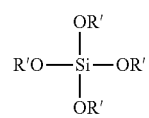

wherein R' is selected from C1 to C6 alkyl groups; and
    (iv) at least one water-soluble compound selected from the group consisting of compounds of the element Zr, compounds of the element Ti, and mixtures thereof;
    wherein the element Si in (i), (ii), and (iii) in the aqueous coating composition has a molar ratio to a sum of the elements Zr and Ti in the aqueous coating composition that ranges from 40:1 to 500:1 and wherein the amount of the water-soluble compound (iv) of the elements Zr and/or Ti in the overall composition is from 0.2 wt. % to 2 wt. %, with respect to the elements Zr and Ti; and wherein the aqueous coating composition further comprises a water soluble or water dispersible resin selected from the group consisting of polyurethane, polyurethane dispersion, and acrylic hybrid resin, the water soluble or water dispersible resin being present in an amount ranging from 6 to 12 wt. % of the aqueous coating composition, wherein the water soluble silane-functional oligomer comprising terminal silyl groups (ii) includes the polyether backbone and is a reaction product of:

a) at least one epoxy resin selected from the group consisting of bisphenol A resins having a number average molecular weight of less than 2000, b) at least one amino-functional organosilane comprising aminoethyltriethoxy silane, and c) at least one multifunctional organic compound comprising polyoxyethylene tallow amine having at least two hydroxyl functional groups;

wherein the molar ratio of —$NH_2$ groups to epoxy groups ranges from 0.25 to 2.2.

* * * * *